United States Patent
Goyal et al.

(10) Patent No.: US 10,271,114 B2
(45) Date of Patent: Apr. 23, 2019

(54) UPDATE OF A DIAL PLAN FOR A CALL CONTROL SYSTEM

(71) Applicant: Cisco Technology, Inc., San Jose, CA (US)

(72) Inventors: Ritu Goyal, San Jose, CA (US); Nirmala Kulandaivelu, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/648,467

(22) Filed: Jul. 13, 2017

(65) Prior Publication Data
US 2019/0020934 A1 Jan. 17, 2019

(51) Int. Cl.
*H04Q 3/545* (2006.01)

(52) U.S. Cl.
CPC ..... *H04Q 3/54533* (2013.01); *H04Q 3/54591* (2013.01); *H04Q 2213/13353* (2013.01); *H04Q 2213/13562* (2013.01)

(58) Field of Classification Search
CPC ........... H04Q 3/54533; H04Q 3/54591; H04Q 2213/13353; H04Q 2213/13562
USPC .................................................... 379/221.14
See application file for complete search history.

(56) References Cited

U.S. PATENT DOCUMENTS

| 8,522,085 B2 | 8/2013 | Agrawal et al. |
| 8,625,764 B2 | 1/2014 | Bhogal et al. |
| 8,695,074 B2 | 4/2014 | Saraf et al. |
| 9,294,864 B2 | 3/2016 | Chen et al. |
| 2003/0225686 A1* | 12/2003 | Mollett .................. G06Q 20/00 705/38 |
| 2007/0127661 A1 | 6/2007 | Didcock |

FOREIGN PATENT DOCUMENTS

EP 1742493 1/2007

OTHER PUBLICATIONS

Agrawal, Hira et al.; Learning Program Behavior for Run-Time Software Assurance, In Computational Intelligence in Security for Information Systems, pp. 135-142. Springer Berlin Heidelberg, 2009.
Devanbu, Premkumar T. et al.; Taxonomic Plan Reasoning, Artificial Intelligence 84, No. 1-2 (1996): 1-35.
Marković, Nikola et al.; Statistical and Machine Learning Approach for Planning Dial-A-Ride Systems, Transportation Research Part A: Policy and Practice 89 (2016): 41-55.
Wikipedia; Least-Cost Routing (accessed Apr. 2, 2017). Can be seen at: https://en.wikipedia.org/w/index.php?title=Least-cost_routing &oldid=763710464.

* cited by examiner

*Primary Examiner* — Quynh H Nguyen

(57) ABSTRACT

In one embodiment, a method including analyzing a plurality of dialed sequences that are associated with unrouted calls in accordance with one or more candidacy rules, based at least partly on the analyzing, defining one or more candidate dial patterns for addition to a set that includes zero or more dial patterns in use for call control, and performing at least one action which promotes addition of the one or more candidate dial patterns to the set.

20 Claims, 5 Drawing Sheets

UPDATE OF A DIAL PLAN FOR A CALL CONTROL SYSTEM

TECHNICAL FIELD

The present disclosure generally relates to dial plans.

BACKGROUND

An administrator may be responsible for specifying dial patterns in a dial plan to be used by a call control system for call control, such as for call routing and/or call prevention. If when initiating a call, a user uses a dialing device to dial a sequence that conforms to any of the dial patterns in the dial plan for call routing, the call is routed, but if the sequence does not conform to any of the dial patterns for call routing then the call is not routed. In the latter case, an error indication indicative of the non-routing may be outputted by the dialing device, such as an error tone or message.

BRIEF DESCRIPTION OF THE DRAWINGS

So that the present disclosure may be understood by those of ordinary skill in the art, a more detailed description may be had by reference to aspects of some illustrative implementations, some of which are shown in the accompanying drawings. The appended drawings, however, illustrate only some example features of the present disclosure and are therefore not to be considered limiting, for the description may admit to other effective features.

Figure 1:
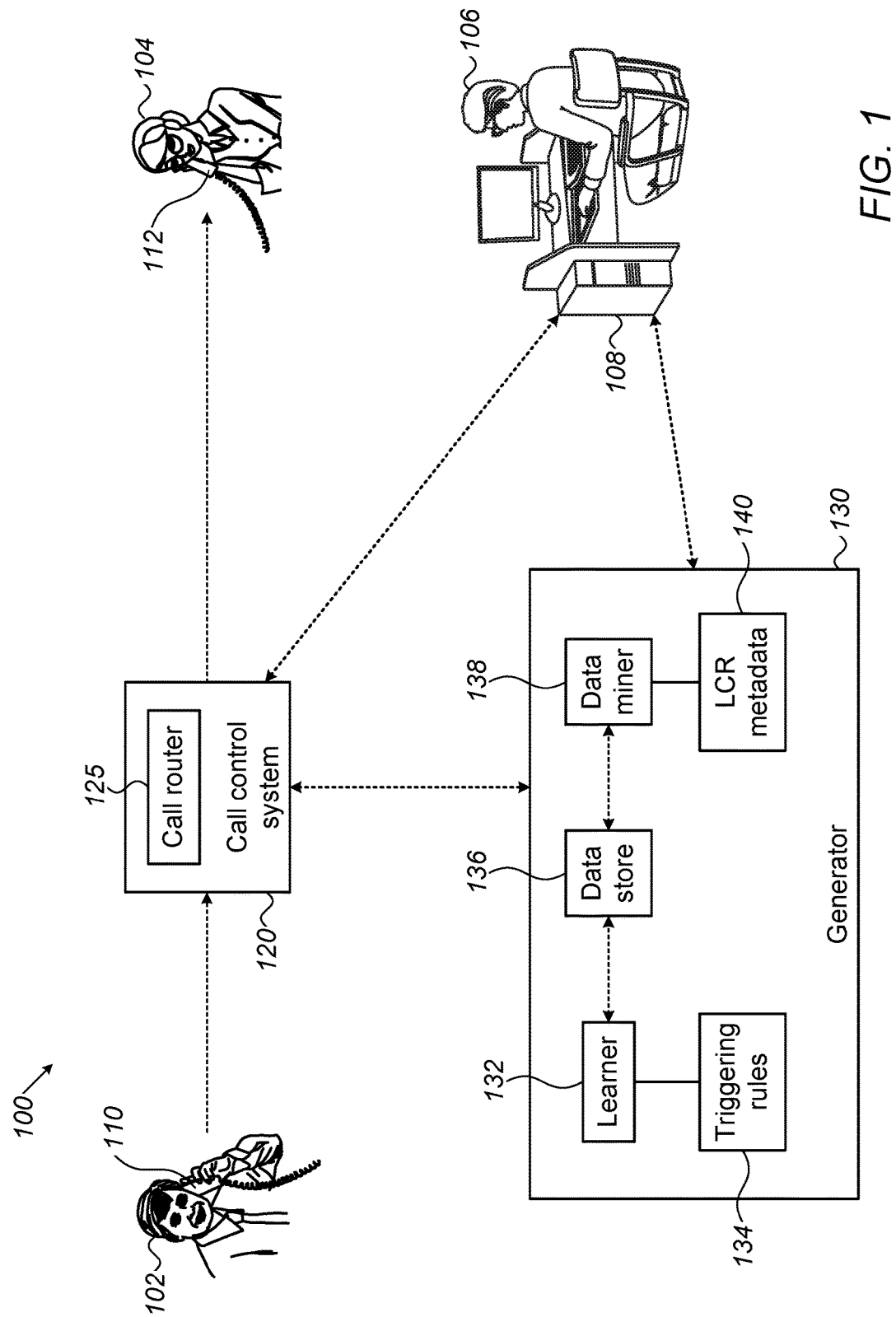
FIG. 1 is a partly pictorial block diagram of a system, in accordance with some embodiments of the presently disclosed subject matter.

In accordance with common practice the various features illustrated in the drawings may not be drawn to scale. Accordingly, the dimensions of the various features may be arbitrarily expanded or reduced for clarity. In addition, some of the drawings may not depict all of the modules, stages, etc. of a given system, method, etc.

DESCRIPTION OF EXAMPLE EMBODIMENTS

Overview

There is provided, in accordance with some embodiments of the presently disclosed subject matter, a method including analyzing a plurality of dialed sequences that are associated with unrouted calls in accordance with one or more candidacy rules, based at least partly on the analyzing, defining one or more candidate dial patterns for addition to a set that includes zero or more dial patterns in use for call control, and performing at least one action which promotes addition of the one or more candidate dial patterns to the set.

There is further provided, in accordance with some embodiments of the presently disclosed subject matter, a system including a dialing device adapted to receive a first dialed sequence as input for a first call and to output an error indication indicative of the first dialed sequence not conforming to any dial pattern from a set of zero or more dial patterns in use for call routing and the first call consequently not being routed, the dialing device being adapted, after a first dial pattern to which at least the first dialed sequence conforms is added to the set, to receive a second dialed sequence as input for a second call which is identical to the first dialed sequence or is not identical but still conforms to the first dial pattern, and to communicate in the second call with a destination device associated with the second dialed sequence due to the first dial pattern having been added to the set and the second call having been routed consequently and answered, wherein the first dial pattern was defined at least partly based on an analysis, in accordance with one or more candidacy rules, of a plurality of dialed sequences, including the first dialed sequence, that are associated with unrouted calls.

DETAILED DESCRIPTION OF EXAMPLE EMBODIMENTS

Different call control systems may implement different dial plans (also referred to as policies). A given dial plan may include a set of zero or more dial patterns (also referred to as dialing rules) that a given call control system uses for call control. The given call control system may be associated with a communications service provider, with an entity (e.g. company, organization, home, etc.), etc. For example, the set of zero or more dial patterns in use for call control, or in other words the set that the given call control system uses for call control (also referred to as the "call control set"), may include a set of zero or more dial patterns in use for call routing (or in other words the set that the given call control system uses for call routing, also referred to as the "call routing set"); and/or may include a set of zero or more dial patterns in use for preventing calls (or in other words the set that the given call control system uses for call prevention, also referred to as the "call prevention set").

The differences in dial plans may arise due to differences between regions, between entities, etc. For example, the dial patterns for initiating calls of different call classes (e.g. local, national, international, mobile, toll-free, premium, service, emergency etc.) may differ from region to region, such as from country to country, or even within a country. In this example, the region that is relevant for the dial plan may not necessarily be the actual physical area of the call initiation, but may be a different physical area, e.g. due to the implementation of number portability, mobility of cellular telephones, and/or use of voice over Internet protocol (VoIP). In another example, there may not be uniformity among call control systems regarding interface(s) (e.g. expected input). Therefore, dial patterns may not necessarily be transferrable from one call control system to another call control system. For instance, the dial pattern when dialing a number external to an entity that is associated with a call control system, or when dialing a number internal to the entity, may differ from entity to entity, e.g. due to entity preferences.

In some embodiments of the presently disclosed subject matter, update of a dial plan may be promoted. At the time of promotion, the call control set in the dial plan may include no dial patterns for call control or may include at least one dial pattern for call control. A plurality of dialed sequences associated with unrouted calls may be analyzed in accordance with one or more candidacy rules. Based at least partly on such analyzing, one or more candidate dial patterns may be defined for addition to the call control set. Addition of the candidate dial pattern(s) to the call control set may then be promoted. Additionally or alternatively, dialed sequences that are associated with routed calls and/or prevented calls may be compared to dial pattern(s) in the call control set. Based at least partly on the comparing, one or more unused dial patterns in the call control set may be determined. Deletion of the unused dial pattern(s) may then be promoted. Additionally or alternatively, dial pattern(s) may be promoted for addition and/or deletion based at least partly on analysis of dial pattern(s) that were previously promoted for addition and/or deletion. Any dialed sequence may include, for instance, digit(s) and/or other symbol(s) (e.g. hash, asterisk, plus, etc.) that may be dialed.

Such embodiments of the presently disclosed subject matter may allow a reduction in the number of dial patterns that need to be specified, or a complete elimination of the need to specify dials patterns for a dial plan when first deploying a given call control system. Specification of dial patterns for a dial plan prior to deployment of a given call control system may include, for instance, manual entry of dial pattern(s) (e.g. by answering intuitively simple questions in a user interface) and/or manual copying of template(s) such as from earlier version(s) of the given call control system or from other call control system(s), if available. It is noted that typically, although not necessarily, such template(s) are not publicly available. Specification of dial patterns for a dial plan of a given call control system (whether by entry, copying of template(s), etc.) may require knowledge particular to the given call control system. As the particular knowledge may vary from region to region, and/or from entity to entity, concurrent deployment of multiple call control systems having respective dial plans may be challenging, if specification of all or many of the dial patterns in the respective dial plans were to take place prior to deployment.

However, in accordance with some embodiments of the subject matter, instead of specifying (or attempting to specify) all of the relevant dial patterns during the initial deployment, a limited number of dial patterns may be specified such as a dial pattern for international calls including a country code, dial pattern(s) for emergency number(s), and a dial pattern for local calls. In accordance with some other embodiments, e.g. for a Beta rollout, lab environment, and/or for a call control system of a secondary line (such as a voice over internet protocol "VoIP" call control system for entity/ies also having primary public switched telephone network "PSTN" and/or cellular phone(s)), no dial patterns may be specified during the initial deployment. Such embodiments (with zero or a limited number of dial pattern(s) specified) may allow for a much quicker initial deployment than if many or all of the dial patterns are specified. For instance, an initial deployment may take minutes rather than weeks. Additionally or alternatively, such embodiments may potentially allow initial deployment of many call control systems e.g. for different regions and/or entities) in parallel, and/or may reduce the costs of deployment.

In examples where the call control set initially includes zero specified dial patterns (or in other words no dial pattern is initially specified), the definition of candidate dial patterns to promote for addition to the call control set, based at least partly on analysis of telephony traffic (e.g. of dialed sequences), may be considered to include machine learning. In examples where a set of one or more dial patterns are initially specified for the call control set, or an updated call control set includes one or more dial pattern(s), the definition of candidate dial patterns to promote for addition to the call control set, based at least partly on analysis of telephony traffic (e.g. of dialed sequences not conforming to any dial pattern in the set), may be considered to include supervised machine learning. It is noted that embodiments of the subject matter may also include other aspects of machine learning or supervised machine learning, such as the determination of unused dial pattern(s) to promote for deletion based at least partly on analysis of telephony traffic (e.g. dialed sequences associated with routed calls and/or prevented calls); the determination of dial pattern(s) to promote for deletion and/or addition based at least partly on dial pattern(s) previously promoted for addition and/or deletion; and/or the determination of changes which may be implemented to the analysis (e.g. update of various triggering rules) based at least partly on dial pattern(s) previously promoted for addition and/or deletion; etc.

Such embodiments of the presently disclosed subject matter may additionally or alternatively allow for smart dial plans, meaning dial plans that are optimized for usage and that may be refined over time.

For example, dial patterns in a dial plan may be optimized for usage in accordance with such embodiments because the dial patterns promoted for addition and/or deletion may be reflective of user dialing habits. In contrast, a-priori specification of dial patterns prior to deployment of a call control system may rely heavily on dialing requirements that may not necessarily coincide with dialing habits, as dialing requirements may be easier to research than dialing habits.

The term dialing requirements as used herein include requirements instituted by a governmental authority, a manufacturer of a call control system, a communications service provider, an entity, etc. In contrast, the term dialing habits as used herein includes habits of the actual users that dial the sequences. The dialing habits of users may not necessarily completely overlap with the dialing requirements, depending on the extent to which users accept and/or are aware of the dialing requirements. The sequences that users dial (e.g. by way of dialing devices) therefore reflect the dialing habits of the users, but not necessarily the dialing requirements. Often, the sequences dialed by users may be limited to sequences that comply with the dialing requirements, but in other cases the dialed sequences may include additional sequences that do not comply with the dialing requirements. In the latter cases, if dial patterns for call routing were specified for a dial plan in accordance with the dialing requirements, sequences dialed by the users, which are reflective of the dialing habits but not of the dialing requirements, would not conform to the specified dial patterns for call routing, and therefore the calls associated with the dialed sequences would not be routed. Moreover, certain specified dial patterns that are reflective of the dialing requirements but not of the dialing habits may not actually be needed for call control, since sequences dialed by the users do not conform to such dial patterns.

In another example, a dial plan may additionally or alternatively be refined over time, in accordance with such embodiments, since such embodiments allow for updating of a dial plan over time (e.g. by addition and/or deletion of certain dial pattern(s)) as dialing habits change. Such reactive refining of the dial plan lessens or negates the need to anticipate changes in dialing habits and to then make change(s) to dial plan(s) proactively; and/or the need to make change(s) to dial plan(s) in response to comments received from users. The changes in dialing habits, for instance, may result from adoption by users of changes in dialing requirements (e.g. due to new zone(s), new area code(s), different interface(s) instituted by manufacturer(s), new dialed sequence(s) in service, etc.), may result from publicizing of protocol(s) (e.g. E.164 protocol), may result from change(s)

in dialed sequence(s) in service (e.g. service instituted and/or ended to one or more users/devices) and/or may result from any other factor(s).

In some cases, embodiments of the presently disclosed subject matter may also allow for refinement of dial plan(s) over time by way of making proactive change(s) to dial plan(s) due to anticipated change(s) in dialing habits and/or by way of making change(s) to dial plan(s) due to comment(s), in addition to allowing for the updating of dial plan(s) in reaction to detected changes in dialing habits, and/or proactively based at least partly on analysis of dial pattern(s) previously promoted for addition and/or deletion.

Referring now to the drawings, FIG. 1 is a partly pictorial block diagram of a system 100, in accordance with some embodiments of the presently disclosed subject matter.

As shown in FIG. 1, system 100 includes a dialing device 110, a call control system 120 which includes a call router 125, and a generator 130. Dialing device 110 may be adapted to be used by a first user 102 (also referred to herein as "user 102") for dialing a sequence when first user 102 is initiating a call, say, to a second user 104. Assuming the dialed sequence is associated with a second device 112 that is associated with second user 104, the second device 112 is the destination device for the call. Call control system 120 (e.g. call router 125) may be adapted to route the call to second device 112 of second user 104, if the dialed sequence conforms to any dial pattern in use for call routing in a dial plan associated with call control system 120. Generator 130 may be adapted to promote update of the dial plan and/or provide information regarding call control system 120, e.g. based at least partly on examination of dialed sequences handled by call control system 120, examination of the dial plan of call control system 120, etc.

As shown in FIG. 1, generator 130 includes a learner 132, a triggering rules 134, a datastore 136, a data miner 138 and a least cost routing "LCR" metadata 140. Learner 132 may be adapted to perform machine learning and/or supervised machine learning. Learner 132 may be adapted to receive dialed sequences from call control system 120 (e.g. from call router 125); store dialed sequences in datastore 136; process dialed sequences (e.g. including analyzing dialed sequences); define candidate dial patterns and/or determine unused dial patterns, based at least partly on the processing; and/or promote addition of candidate dial patterns and/or deletion of unused dial patterns. The dialed sequences may be processed, for example, in accordance with rules from triggering rules 134. Data miner 138 may be adapted to mine data in datastore 136 in order to determine aggregated information regarding call control system 120. Data miner 138 may be adapted to use LCR metadata 140 in determining the aggregated information. Optionally an administrator 106 administers the dial plan, and may accordingly be notified (or in other words be provided with notification) regarding dial patterns promoted for addition and/or deletion, and/or of aggregated information. Administrator 106 may be notified, for instance, by way of a user interface of an administrator device 108 associated with administrator 106, where the administrator device 108 is adapted to output such notification and/or such aggregated information.

In various embodiments, the modules shown in FIG. 1 (e.g. 108, 110, 120, 125, 130, 132, 134, 136, 138 and/or 140) may each include any appropriate software and/or hardware to implement the functionality ascribed herein to the module in system 100 (e.g. functionality ascribed to the module in the description of FIG. 1 and/or elsewhere in the present disclosure). Software may include firmware, when appropriate. Software may, for example, be included in one or more computer readable media. A particular computer readable medium, for example, may include any suitable medium for transferring software, e.g. if software is downloaded in electronic form over a network. Alternatively or additionally, a particular computer readable medium may, for example, include any computer storage medium (also referred to herein as "memory") suitable for storing software, such as an optical storage medium, a magnetic storage medium, or an electronic storage medium.

Dialing device 110 may be any suitable device for dialing dialed sequence(s), such as a telephone, smartphone, fax, personal computer, laptop computer, softphone, etc. For example, a dialed sequence may include one or more symbols (e.g. any digit symbol, hash symbol, asterisk symbol, plus symbol etc.) which may be dialed by a user using dialing device 110, depending on the type of dialing device 110. The dialed sequence may or may not include repeated symbol(s), depending on the dialed sequence.

In order to act as a destination device for call(s), second device 112 may be any suitable device that is associated with at least one sequence that may be dialed (e.g. by user 102 using dialing device 110). For instance second device 112 may be a telephone, smartphone, fax, personal computer, laptop computer, softphone, etc.

Administrator device 108 may be any suitable device adapted to output to administrator 106 and optionally to receive input from the administrator 106. Administrator device 108 may, for instance, be a smartphone, a personal computer, a laptop computer, an input and/or output device, etc. An example of such an input and/or output device may be a notification panel associated with call control system 120 and/or with generator 130. Administrator device 108 may include any suitable user interface for interaction with administrator 106. Administrator device 108 is optionally adapted to run customized software (e.g. customized web application, mobile application, client application, etc.) for interacting with generator 130 and/or call control system 120. Administrator device 108 may be at the same location as call control system 120 and/or as generator 130; or may be remote to both call control system 120 and generator 130.

Call control system 120 may be any suitable type of call control system. For example call control system 120 may be a telephone exchange, a private box exchange, a voice over Internet protocol (VoIP) call processor, a base station of a cellphone network, etc. Call control system 120 may include any suitable hardware and/or software, which may vary depending on the type of call control system. For instance, call control system 120 may include any of: switching equipment, transceiver(s), memory (e.g. for storing dial plans and/or software), processor(s), network interface(s), etc. Software, if used by call control system 120, may additionally or alternatively be transferred to call control system 120 over a suitable medium.

Call control system 120 may be located at any suitable location for routing and/or preventing calls from dialing device 110 and optionally from other devices suitable for dialing dialed sequences. Such other devices may include other device(s) associated with user 102 and/or device(s) associated with other user(s) (optionally including second device 112 of second user 104). Call control system 120 may not necessarily be at the same location as dialing device 110 as long as call control system 120 may receive dialed sequences from dialing device 110, directly or indirectly. Calls routed by call control system 120 may be routed over any suitable network(s) such as a PSTN, an intercommunication network (e.g. interconnecting extensions of an entity), a cellular network, a local area network, a wide area network, the Internet, etc.

In some embodiments dialing device 110 may be adapted to act as a destination device for certain calls. In such embodiments, dialing device 110 may be any device that is suitable for dialing sequence(s), and that is associated with at least one sequence that may be dialed. Calls destined for dialing device 110 optionally pass through the same call control system 120. In such cases, call control system 120 may include rule(s) relating to calls destined for dialing device 110 (and optionally for other device(s)). Such rule(s) may be in addition to dialing rule(s) in call control system 120 relating to calls from dialing device 110 (and optionally from other device(s)). For example, rule(s) relating to calls destined for dialing device 110 may include rules for blocking certain calls destined for dialing device 110 (e.g. calls from telemarketers) from reaching dialing device 110; and/or may include rule(s) for letting through calls destined for dialing device 110.

Call control system 120 may include other functionality relating to call control, in addition to functionality discussed herein, such as conventional functionality known in the art.

Generator 130 may include, for instance, one or more processor(s) adapted to execute suitable software (e.g. in one or more computer readable media) in order to implement learner 132 and data miner 138. In some cases, such processor(s) may also be adapted to execute suitable software in order to implement other functionality related to the subject matter and/or functionality that is unrelated/tangential to the subject matter. Examples of suitable processor(s) include graphics processing unit(s) GPU(s), digital signal processor(s) (DSP(s)), central processing units (CPU(s)), etc. Datastore 136, triggering rules 134 and/or LCR metadata 140 may be implemented in one or more computer storage media.

Depending on the embodiment, generator 130 and call control system 120 may or may not be at the same location. If at the same location, generator 130 and call control system 120 may or may not share hardware, such as memory, processor(s), etc. Optionally, an application program interface (API) (e.g. an open API) facilitates interaction between generator 130 and call control system 120, or optionally call control system 120 and generator 130 are integrated together.

Either or both of call control system 120 and generator 130 may be at a site of a communications service provider (e.g. cellular company, VoIP company, PSTN company, etc.) associated with call control system 120, which provides call control services to users such as user 102. Additionally or alternatively, either or both of call control system 120 and generator 130 may be at a site of an entity associated with call control system 120, e.g. at the same site as dialing device 110 assuming user 102 is associated with the entity. Additionally or alternatively, either or both of call control system 120 and generator 130 may be on a cloud (e.g. private cloud, community cloud, public cloud, hybrid cloud, etc.). Although generator 130 is shown in a box, in some embodiments, not all of the modules shown in generator 130 (e.g. 132, 134, 136, 138, 140) may necessarily be in the same physical unit (e.g. same machine), or even at the same location. In some cases, the same generator 130 may be associated with a plurality of call control systems, including call control system 120. Typically although not necessarily in such cases, generator 130 operates independently for each associated call control system.

In some embodiments, two or more modules shown in FIG. 1 may be consolidated into fewer modules performing the functionality attributed to the two or more modules. For example, learner 132 and data miner 138 may be consolidated into one module. Additionally or alternatively, one or more modules shown in FIG. 1 may be divided into a larger number of modules. Additionally or alternatively, functionality attributed herein to a particular module shown in FIG. 1 may instead or also be performed by one or more other module(s) of FIG. 1. In any of these embodiments, the software and/or hardware of the module(s) may be adjusted as necessary.

Although certain examples described herein refer to an initial deployment of call control system 120, system 100 may not necessarily be deployed all at once. For instance, generator 130 may be implemented for call control system 120 during the initial deployment of call control system 120, or may be implemented for call control system 120 when call control system 120 is already functional. In the case of implementation during the initial deployment of call control system 120, the call control set in use by the given call control system 120 at the time of initial deployment may subsequently be updated (e.g. by addition and/or deletion of dial pattern(s)) as described below with reference to methods 200 (FIG. 2), 300 (FIG. 3) and/or 400 (FIG. 4). In the case of implementation for a given call control system 120 that is already functional, the call control set in use by the given call control system 120 at the time of the first implementation of generator 130 for the given call control system 120 may subsequently be updated (e.g. by addition and/or deletion of dial pattern(s)) as described below with reference to methods 200, 300 and/or 400. In either case, generator 130 (e.g. datastore 136) optionally holds a copy of the call control set in use by the given call control system 120 at the time of implementation of generator 130 and subsequently; for instance, for the purposes of analysis, data mining, etc. in one or more of the methods described herein (e.g. in any of methods 200, 300, 400 or 500—FIG. 5).

A system in accordance with the presently disclosed subject matter may include any appropriate software and/or hardware to implement part or all of the functionality described herein, without necessarily including any or all of the module(s) shown in FIG. 1. For example the system may include any of: a device suitable for dialing (e.g. dialing device 110), a device associated with an administrator (e.g. administrator device 108), a call control system (e.g. call control system 120) and/or a generator (e.g. generator 130) which may include one or more module(s) for promoting updating of a dial plan and/or for providing information regarding a call control system (e.g. such as any of module(s) 132, 134, 136, 138 and/or 140). Nevertheless, for the sake of example, methods 200, 300 and 400 will be described below with reference to one or more modules illustrated in FIG. 1 for system 100. In embodiments with a different system in accordance with the subject matter, such method(s) may be implemented by such a system, mutatis mutandis.

Figure 2:
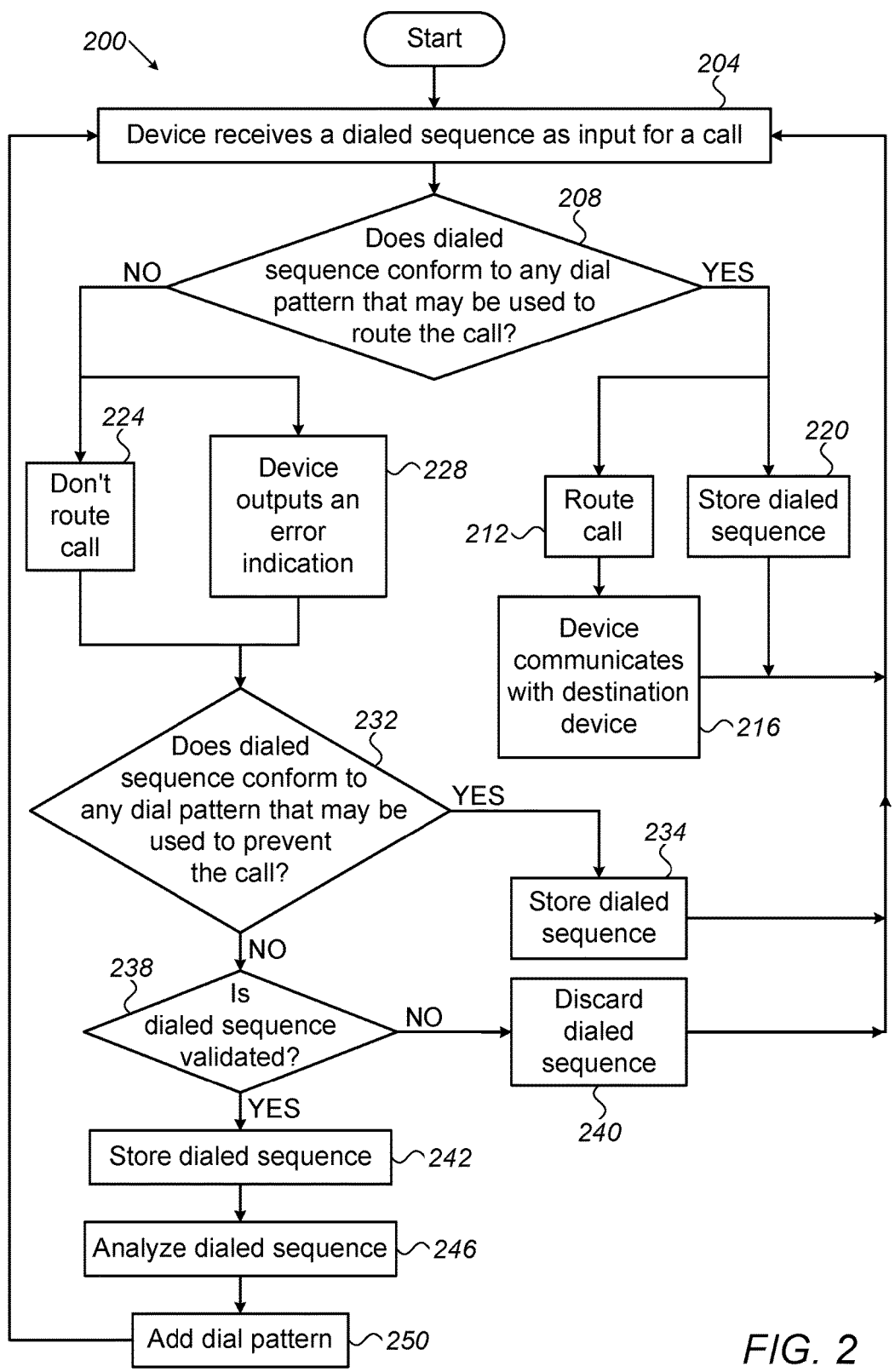
FIG. 2 is a flowchart of a method, in accordance with some embodiments of the presently disclosed subject matter.

FIG. 2 is a flowchart of a method 200, in accordance with some embodiments of the presently disclosed subject matter.

In stage 204, dialing device 110, which is adapted to receive dialed sequences from user 102, receives a dialed sequence (e.g. 17184586222) as input for a call. User 102 may have inputted the dialed sequence in any suitable manner for dialing device 110, such as by pressing on a keypad of dialing device 110, turning a dial on dialing device 110, selecting a dialed sequence, clicking, etc. The dialed sequence is provided to call control system 120.

Optionally, dialing device 110 and/or call control system 120 collates the symbols of the sequence. Each symbol in the dialed sequence may be collated until no more symbols are detected for the sequence (e.g. until a timeout has occurred since the last collated symbol).

In stage 208, call control system 120 determines whether or not the dialed sequence conforms to any dial pattern that may be used by call control system 120 to route the call.

For example, a call routing set may be included in a dial plan stored in call control system 120. The dial plan may be the initial dial plan, specified during the initial deployment; or may be an updated dial plan, updated in accordance with previous iterations of method 200, 300 and/or 400, and/or by any other method (e.g. proactive updating of the dial plan in anticipation of change(s) in dialing habits, updating in response to user comments, etc.).

Call control system 120 may compare the dialed sequence to the dial pattern(s), if any, in the call routing set of the dial plan in order to determine whether the dialed sequence conforms to (or in other words maps to, is consistent with, fits, etc.) any of the dial pattern(s).

If the dialed sequence conforms to at least one dial pattern that may be used to route the call (yes to stage 208), then in stage 212, the call control system routes the call. In stage 216, dialing device 110 communicates with a destination device associated with the inputted dialed sequence (e.g. second device 112), due to the call having been routed and answered (e.g. by second user 104). Optionally in stage 220, the dialed sequence is stored, for instance by generator 130 (e.g. by learner 132 in datastore 136). If the dialed sequence is to be stored, the dialed sequence may be provided by call control system 120 to generator 130, optionally with an indication that the associated call was routed and/or a time indication, so that the dialed sequence may be used, for instance, in analysis and/or data mining, as will be discussed in more detail below with reference to FIGS. 4 and 5. In other cases, the dialed sequence may be discarded. Method 200 then iterates to stage 204 with respect to another dialed sequence that may be an identical dialed sequence or a different dialed sequence.

If the dialed sequence does not conform to any dial pattern that may be used to route the call (no to stage 208), then in stage 224, call control system 120 does not route the call. In stage 226, dialing device 110 outputs an error indication such as a special information tone indicative of a dialing error, and/or a message (e.g. fax error sheet, text message, voice message, etc.) for user 102.

In some embodiments the dial plan that is stored in call control system 120 may include dial pattern(s) for call prevention and dial pattern(s) for call routing. The non-routing of the call may therefore arise when the dialed sequence does not conform to any dial pattern for call routing or for call prevention that may be in the dial plan; or when the dialed sequence does not conform to any dial pattern in the dial plan for call routing but does conform to at least one dial pattern for call prevention in the dial plan. In such embodiments, in stage 232, call control system 120 determines if the dialed sequence conforms to dial pattern(s) that may be used to prevent the call, if any. Alternatively, the comparisons of stages 208 and 232 may be performed in parallel. If the dialed sequence conforms to at least one dial pattern for call prevention (yes to stage 232), then optionally in stage 234 the dialed sequence is stored, for instance by generator 130 (e.g. by learner 132 in datastore 136). If the dialed sequence is to be stored, the dialed sequence may be provided by call control system 120 to generator 130, optionally with an indication that the associated call was prevented and/or with a time indication, so that the dialed sequence may be used, for instance, in analysis and/or data mining, as will be discussed in more detail below with reference to FIGS. 4 and 5. In other cases, the dialed sequence may be discarded. Method 200 then iterates to stage 204 with respect to another dialed sequence that may be an identical dialed sequence or a different dialed sequence. In other embodiments where the dial plan excludes dial pattern(s) for call prevention, stages 232 and 234 may be omitted.

If the dialed sequence does not conform to any dial pattern for call prevention (no to stage 232), or if stage 232 is omitted, then the dialed sequence is not discarded but undergoes processing by generator 130.

The processing of the dialed sequence, optionally includes validation stage 238. In validation stage 238, generator 130 (e.g. learner 132) validates the dialed sequence in accordance with one or more validation rules comprised in triggering rules 134. For example, the validation rules may allow a gross filtering of dialed sequences that are extremely unlikely to be associated with any actual destination device. Continuing with describing such an example, the validation rules may not validate the dialed sequence, for instance, if the dialed sequence is incomplete (e.g. too short to be a complete sequence); if the dialed sequence has unexpected symbols (e.g. hash or asterisk in the middle of the dialed sequence); if the dialed sequence does not comprise any digits; if the dialed sequence includes only zeros or only ones; etc. In some cases, each symbol in the dialed sequence is collated until the sequence passes validation or there are no more symbols in the dialed sequence (e.g. a timeout has occurred since the last collated symbol). Additionally or alternatively, collation may have occurred in dialing device 110 or in call control system 120 as discussed above. If the dialed sequence is not validated, then in stage 240 the dialed sequence may be discarded. Alternatively if the dialed sequence is not validated, the dialed sequence may be stored in datastore 136, e.g. in a manner which is indicative of non-validation and/or with a time indication so that the dialed sequence may be used, for instance, in data mining in method 500 of FIG. 5. Method 200 then iterates to stage 204 with respect to another dialed sequence that may be an identical dialed sequence or a different dialed sequence.

If the dialed sequence is validated then method 200 proceeds to stage 242 for the dialed sequence.

In some cases, stage 238 may be omitted, and the processing begins with stage 242. In these cases, stage 240 may also be omitted. For example, stage 238 may be omitted if no gross filtering is desired, so that the dialed sequence is necessarily analyzed.

In stage 242, the dialed sequence is stored by generator 130, for instance by learner 132 in datastore 136. The dialed sequence may be stored, for example, in a manner indicative of the dialed sequence being associated with an unrouted call, in a manner indicative of having been validated, in a manner indicative of not conforming to any dial pattern in the dial plan, and/or with a time indication.

In stage 246, the processing continues with analysis of the dialed sequence by generator 130 (e.g. by learner 132).

In stage 250, the dial plan for call control that is used by call control system 120 is updated by adding a dial pattern, based at least partly on the analysis of stage 246. The dial pattern that is added may be a dial pattern to which the dialed sequence conforms. The added dial pattern may be a dial pattern for call routing, or may be a dial pattern for call prevention provided call prevention is implemented in call control system 120. It is assumed that in the current iteration the added dial pattern, e.g. [1][2-9]XXX[1-9]XXXXXXX, is for call routing and that the dialed sequence conforms to the added dial pattern.

Examples of analysis and dial pattern addition will be described in more detail below with reference to FIG. 3.

After stage 250, method 200 iterates to stage 204 for another dialed sequence which may be an identical dialed sequence as in the previous iteration of stage 204 (e.g. 17184586222) or may be a different dialed sequence (e.g. 16394596571 or 6394596571). For example, it is again assumed that the previous iteration of method 200 resulted in the addition in stage 250 to the dial plan of a dial pattern for use in call routing (e.g. [1][2-9]XXX[1-9]XXXXXXX) to which at least the dialed sequence (e.g. 17184586222) inputted in the previous iteration conforms. If the other dialed sequence inputted in the current iteration is identical (e.g. 17184586222) and therefore conforms to the dial pattern added in the previous iteration of stage 250 or is a different dialed sequence (e.g. 16394596571) that conforms to the dial pattern added in the previous iteration of stage 250, the call associated with the other dialed sequence is routed in the current iteration of stage 212 because of the addition of the dial pattern to the dial plan. If the other dialed sequence inputted in the current iteration is a different dialed sequence (e.g. 6394596571) that does not conform to the added dial pattern, then the call may or may not be routed, depending on whether or not the other dialed sequence conforms to any other dial pattern(s) for call routing that may be included in the dial plan at the time of the call routing decision in the current iteration of stage 208.

Referring again to the description of the previous iteration of method 200, in some instances after performance of stage 246, stage 250 may instead be omitted for the dialed sequence, and so no dial pattern is added to the dial plan. For instance, no dial pattern may be added after performance of the analysis because of the results of the analysis; because administrator 106 did not approve or act with respect to a dial pattern defined at least partly based on the analysis (and optionally amended by administrator 106); etc. In general, a dial pattern to which the dialed sequence conforms may not necessarily be added (at the time of first analysis of the dialed sequence and/or at the time(s) of any later analysis), due to any appropriate reason such as non-validation of the dialed sequence, because of the results of the analysis, because of non-approval/non-action of administrator 106, etc. In cases where the dialed sequence does not result in the addition of a dial pattern to which the dialed sequence conforms, the dialed sequence may have been dialed as such for any reason, e.g. malicious intent, the user forgot symbols for the sequence, dialing interruption, fat fingers, etc. In contrast, if the dialed sequence does result in addition of a dial pattern (either at the time of first analysis or at the time of any later analysis), the dialed sequence may typically although not necessarily be more likely to be reflective of user dialing habits. In such instances where stage 250 is omitted, method 200 may iterate to stage 204 after performance of stage 246 with respect to another dialed sequence that may be an identical dialed sequence or a different dialed sequence.

Again, referring to the description of the previous iteration of method 200, in some cases, the first time that the dialed sequence is analyzed in stage 246 may occur prior to storage of the dialed sequence in stage 242. In some of such cases, stage 242 may be omitted and the dialed sequence may not necessarily be stored, e.g. if the analysis results in the addition of a dial pattern to which the dialed sequence conforms in stage 250. In some other cases, the first time that the dialed sequence is analyzed may occur after the storage of the dialed sequence in stage 242, and there may be a time lag between the time of storage and the time of first analysis of the dialed sequence. For example, there may be a time lag if a first time analysis of the dialed sequence is not necessarily triggered by any of the previous stage(s) of method 200. In such cases, stages 246 and 250 may be omitted, and method 200 may iterate after stage 242 to stage 204 with respect to another dialed sequence that may be an identical dialed sequence or a different dialed sequence.

In some embodiments of method 200, method 200 may include fewer, more and/or different stages than shown in FIG. 2. For example any of stage(s) 220, 232, 234, 238, 242, 246 and/or 250 may be omitted in some embodiments. Additionally or alternatively, in some embodiments, stage(s) may be performed in a different order than shown in FIG. 2, stages shown in FIG. 2 as being performed in parallel may be performed consecutively, and/or stages shown in FIG. 2 as being performed consecutively may be performed in parallel. For example, any of stages 224, 228 and 232 may be performed in any order and/or in parallel. In another example, stages 242 and 246 may be performed in any order and/or in parallel. In another example, if dial pattern(s) for call prevention are not implemented in the dial plan and validation is omitted then any of stages 224, 228, 242 and 246 may be performed in any order and/or in parallel. In another example, stages 212/216 and 220 may be performed in any order and/or in parallel. In another example, stages 208 and 232 may be performed in any order and/or in parallel.

Figure 3:
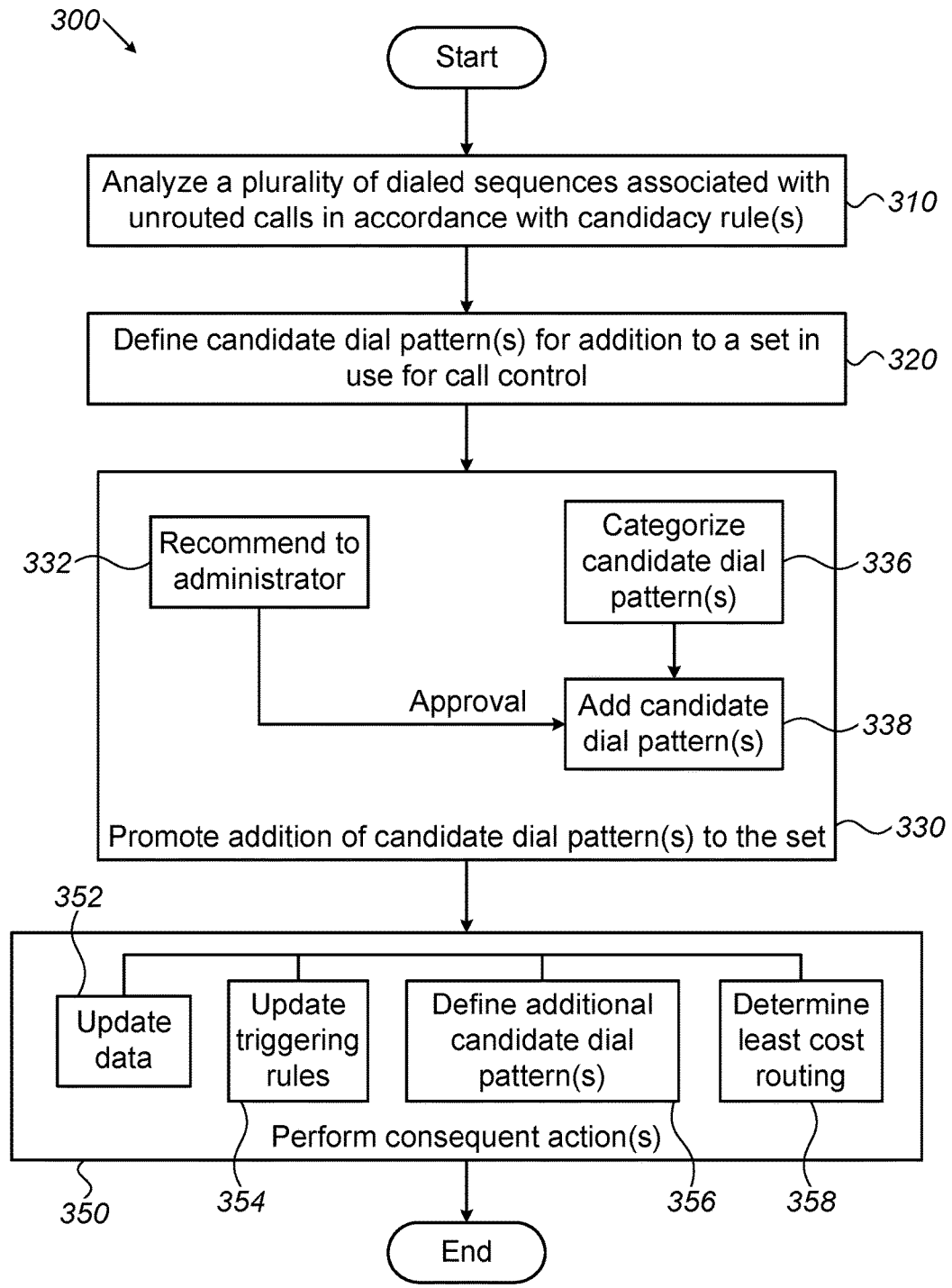
FIG. 3 is another flowchart of a method, in accordance with some embodiments of the presently disclosed subject matter.
Figure 4:
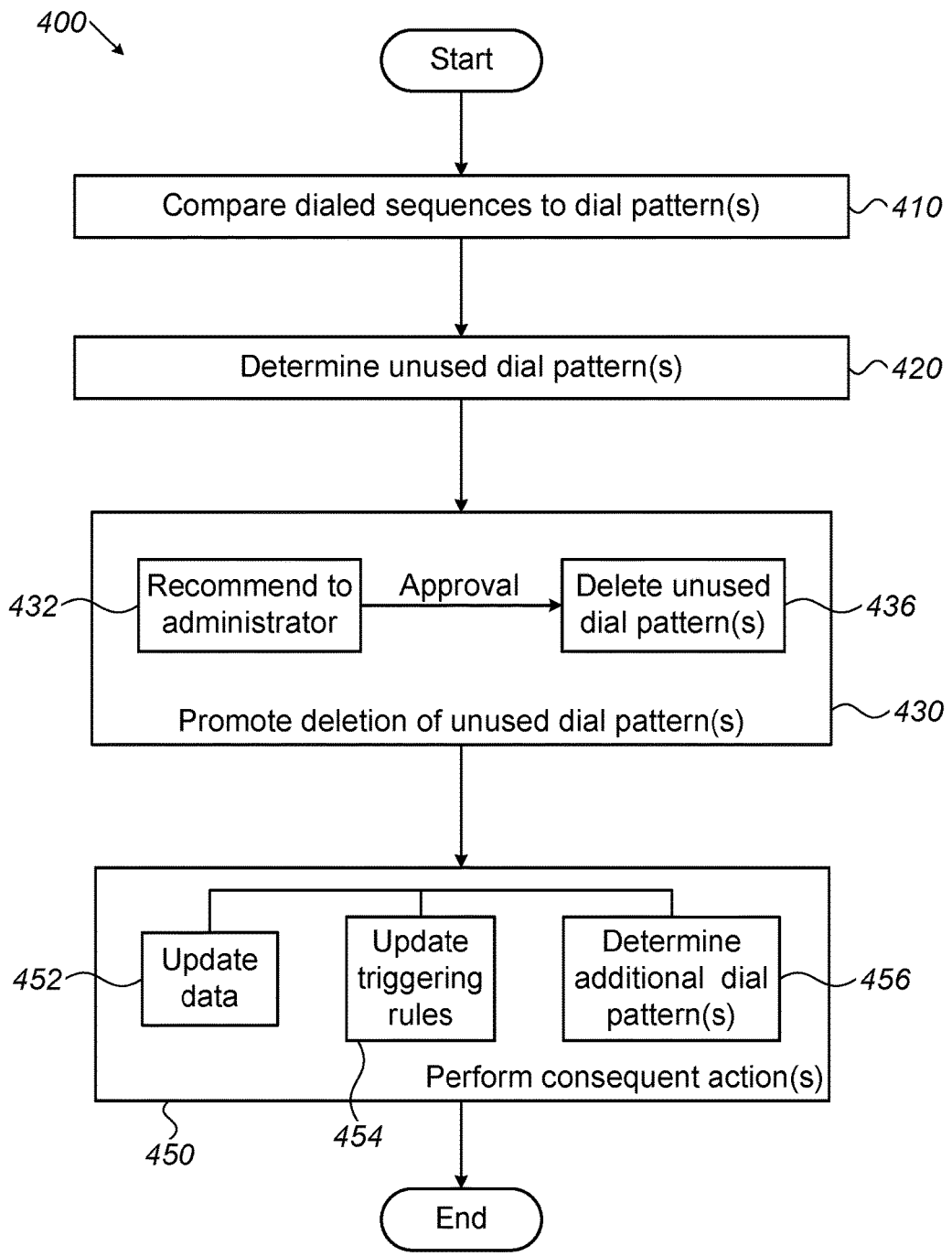
FIG. 4 is yet another flowchart of a method, in accordance with some embodiments of the presently disclosed subject matter.

FIG. 3 is a flowchart of a method 300, in accordance with some embodiments of the presently disclosed subject matter.

In stage 310, a plurality of dialed sequences that are associated with unrouted calls are analyzed by generator 130 (e.g. by learner 132) in accordance with candidacy rule(s), where such candidacy rule(s) are included in triggering rules 134. The plurality of dialed sequences may have been inputted via dialing device 110 and/or via any other device(s) that initiated calls that were not routed by call control system 120.

Any suitable plurality of dialed sequences associated with unrouted calls (e.g. unrouted by call control system 120) may be analyzed. For example, at least part of the plurality of dialed sequences may be stored in datastore 136. In another example the plurality of dialed sequences may additionally or alternatively exclude any dialed sequences that were not validated by generator 130 (see description of stage 238 of FIG. 2 above). In another example, the plurality of dialed sequences may additionally or alternatively exclude any dialed sequences that were determined by call control system 120 to conform to dial pattern(s) for preventing calls, assuming such dial pattern(s) are implemented in call control system 120 and such dialed sequence(s) are provided to generator 130. In another example, the plurality of dialed sequences may additionally or alternatively include dialed sequence(s) associated with a given time period, such as the time period since the last iteration of stage 310, the time period from the beginning of implementation of generator 130 for call control system 120, etc. In such an example, time indications (e.g. indicative of the time of dialing, indicative of the time of the decision not to route, indicative of the time of storage in datastore 136, etc.) are optionally stored in association with the dialed sequences in datastore 136 and may be used to determine which dialed sequences) are associated with a given time period. In another example, the plurality of dialed sequences may additionally or alternatively exclude any dialed sequences which conform to any dial pattern that was promoted for addition to a call control set, and/or which conform to any dial pattern that was added to the call control set.

Any suitable candidacy rule(s) may be implemented for the analysis of stage 310. For example, candidacy rule(s) may include threshold(s). In such an example, a quantity of dialed sequences, from the plurality of dialed sequences that are similar in accordance with at least one criterion may be compared to a threshold (e.g. 15). Dialed sequences may have any appropriate attribute(s) in order to be considered similar in accordance with at least one criterion, such as any of: identical sequence length, one or more identical symbols comprised in corresponding positions in the dialed sequences, etc. In another example, the candidacy rule(s) may additionally or alternatively include a requirement that the latest dialed sequence from the plurality of dialed sequences being analyzed (or at least one dialed sequence, from the plurality of dialed sequences, that is being analyzed for the first time in the current iteration of stage 310) be included in the quantity that is being compared to the threshold. In such an example, the analysis of the plurality of dialed sequences may occur before or after storage of the latest dialed sequence.

Any suitable analysis may be performed in stage 310. For example, the analysis may include grouping dialed sequences from the plurality of dialed sequences in groups of varying levels of similarity. One grouping may be for identical sequences of n (n>0) length (e.g. all dialed sequences of #2444 in one group, all dialed sequences of 5164821678 in another group, etc); another for sequences of n length with identical symbols in n−1 positions in the sequences (e.g. all dialed sequences of #244x in one group where x is any symbol, all dialed sequences of #24x4 in one group, etc.); another for sequences of n length with identical symbols in n−2 positions in the sequence (e.g. all dialed sequences of #24xx in one group, all dialed sequences of #2xx4 in one group); and so on until the final grouping may be for sequences of identical length (e.g. all dialed sequences of xxxxx in one group, all dialed sequences of xxxxxxxxxx in another group, etc.). Additionally or alternatively, fewer or more groupings may be included.

Continuing with describing this example, it is assumed, for instance, that the candidacy rule(s) include the requirement that the latest dialed sequence (e.g. 5142698666) in the plurality is to be included in the quantity that is being compared to the respective threshold. In this instance, the analyzing of the plurality of dialed sequences may include grouping dialed sequences that are similar to the latest dialed sequence, but not necessarily grouping other dialed sequences. It is further assumed, in this instance that the grouping includes a first group of dialed sequences that are identical to the latest dialed sequence (e.g. all dialed sequences of 5142698666); a second group of dialed sequences that are of the same length as the latest dialed sequence and having at least two identical first symbols or identical last symbols as the latest dialed sequence (e.g. assuming for identical first three symbols: all dialed sequences of 514xxxxxxx); a third group of dialed sequences having the same length as the latest dialed sequence and having one identical first symbol or identical last symbol as the latest dialed sequence (e.g. assuming for an identical first symbol: all dialed sequences of 5xxxxxxxxx); and a fourth group of dialed sequences having the same length as the latest dialed sequence (e.g. all dialed sequences of xxxxxxxxxx). In this instance the analyzing may further include performing a first count of the first group; performing a second count of the second group; performing a third count of third group; and performing a fourth count of fourth group. Each of the four counts (i.e. four quantities) may then be compared to respective thresholds. The respective thresholds may be any suitable thresholds and may not necessarily be identical. The respective threshold may, for example be set higher for a broader group, e.g. the first threshold for the first count may be set to a certain number; the second threshold for the second count may be set to equal the sum of the first count and the first threshold; the third threshold for the third count may be set to equal the sum of the second count and the first threshold; etc.

Continuing with the description of method 300, in stage 320, one or more candidate dial patterns for addition to a set that includes zero or more dial patterns in use for call control (meaning one or more dial patterns that are candidate(s) for addition to the call control set), are defined based at least partly on the analyzing of stage 310. The defining may be performed by generator 130 (e.g. by learner 132). Any definition that is suitable and based at least partly on the analyzing may be performed.

For example, the definition may be based solely on the analysis. Referring to the instance described above with the four counts, in this instance in stage 320 beginning with the fourth count, it may be determined whether the fourth count is at least equal to or larger than the fourth threshold. If so then a candidate dial pattern of the same length as the latest dialed sequence with variation in symbols as appearing in the dialed sequences of the fourth count may be defined based on the analyzing, so that at least the dialed sequences of the fourth count may conform to such a candidate dial pattern. If the fourth count is not at least equal to or larger than the fourth threshold but the third count is at least equal to or larger than the third threshold, then a candidate dial pattern having the same length and the identical first or last identical symbol as the latest dialed sequence, and variation in symbols in the other positions as appearing in the dialed sequences of the third count may be defined based on the analyzing so that at least the dialed sequences of the third count may conform to such a candidate dial pattern. If the third count is not at least equal to or larger than the threshold but the second count is at least equal to or larger than the second threshold, then a candidate dial pattern having the same length and the identical at least two first or last symbols as the latest dialed sequence, and variation in symbols in the other positions as appearing in the dialed sequences of the second count may be defined based on the analyzing, so that at least the dialed sequences of the second count may conform to such a candidate dial pattern. If the second count is not at least equal to or larger than the threshold but the first count is at least equal to or larger than the first threshold, then a candidate dial pattern that is identical to the latest dialed sequence may be defined based on the analyzing, so that at least the dialed sequences in the first count may conform to the candidate dial pattern.

Continuing with describing such an instance, it is assumed that the plurality of dialed sequences includes the latest dialed sequence 5142698666 and four other sequences of the same length, namely 5148584122, 5144223335, 7182542217, and 5143612481, and the second count is determined to be larger than the second threshold. A candidate dial pattern that is defined based on the analysis may be, for instance, [514][2,3,4,8][2,5,6][1,2,9,8][2,3,4,8][1,3,4,6][2,3,6,8][1,2,5,6], where the variation in digits in the positions after the first three positions reflect the digits found in the corresponding positions of any of the "four dialed sequences beginning with 514" (namely: 5142698666, 5148584122, 5144223335, and 5143612481), and therefore at least the four dialed sequences beginning with 514 conform to the candidate dial pattern.

In another example, the definition in stage 320 may be based not only on the analyzing but also on certain candidacy rule(s) in triggering rules 134. Such candidacy rule(s) may be related less to the analyzing of the plurality of dialed sequences and more to the definition of the candidate dial pattern(s). Such candidacy rule(s) may include any appropriate candidacy rule(s). For instance, such candidacy rule(s) may include a candidacy rule that any candidate dial pattern may not be identical to any dial pattern in the call control set, and/or may not be identical to any dial pattern that was previously promoted as a candidate for use in call control (e.g. previously promoted for addition to the set then used for call control). Such a candidacy rule may prevent promotion of any candidate dial pattern that is a duplicate, and may thus narrow the candidate dial pattern(s) that may be promoted. Additionally or alternatively, in another instance, the variation in one or more symbols in one or more positions of a candidate dial pattern may be defined more broadly than the variation appearing in the dialed sequences, under circumstances set out by a candidacy rule. In such an instance, the circumstances may include, say, limitations on broadening with respect to certain symbol(s) (e.g. with respect to non-digit symbol(s), "0", "1", etc.). Additionally or alternatively, in another instance, the variation in one or more symbols in one or more positions of a candidate dial pattern may be defined more narrowly than the variation appearing in the dialed sequences, under circumstances set out by a candidacy rule.

Additionally or alternatively, in another instance, the candidacy rule(s) may state when the definition of a candidate dial pattern is to be expanded to encompass at least one dial pattern already in the call control set. In such an instance where dial pattern(s) in the call control set are encompassed, a candidate dial pattern that is added to the call control set (as is or as amended), could replace such dial pattern(s) in the call control set. Continuing with describing such an instance, it may be allowable to encompass dial pattern(s) in the call control set that are associated with certain call class(es), but not allowable to encompass dial pattern(s) in the call control set that are associated with certain other class(es) (e.g. emergency calls). Additionally or alternatively, certain dial pattern(s) in the call control set may be encompassed by a candidate dial pattern that is being defined if such dial pattern(s) in the call control set are similar to dial pattern(s) that could be defined from the analysis and that would also be encompassed by the candidate dial pattern (e.g. similar due to having the same length, the same beginning and/or end, etc.).

Referring, for example, to the dial pattern [514][2,3,4,8][2,5,6][1,2,9,8][2,3,4,8][1,3,4,6][2,3,6,8][1,2,5,6] discussed above, the variation in symbols may be broadened beyond the variation seen in the analysis, in accordance with a candidacy rule, so that the candidate dial pattern is defined for example as [514][1-9]xxxxxxx. Additionally or alternatively, the definition of a candidate dial pattern may be expanded, in accordance with a candidacy rule from [514][2,3,4,8][2,5,6][1,2,9,8][2,3,4,8][1,3,4,6][2,3,6,8][1,2,5,6] to [514][2,3,4,5,8][1-9]xxxxxx in order to encompass a dial pattern already in the set (e.g. [514][2,5][1-9]xxxxxx). It is noted that at least the four dialed sequences beginning with 514 listed above conform to the broadened dial pattern and conform to the expanded dial pattern.

In another example, it is assumed, that Great Britain has the following dial patterns for routing local calls, where "${OUTSIDE_ACCESS}" is a keyword that is replaced based on the implementation:

${OUTSIDE_ACCESS}.[2-9]XXXXX Local Calls (6 digits)
${OUTSIDE_ACCESS}.[2-9]XXXXXX Local Calls (7 digits)
${OUTSIDE_ACCESS}.[2-9]XXXXXXX Local Calls (8 digits)

It is further assumed in this example that only the six digit dial pattern of the above patterns is initially specified in the call control set of the dial plan for Great Britain prior to deployment of call control system 120. Consequently, calls associated with dialed sequences conforming to the six digit dial pattern are routed whereas calls associated with dialed sequences conforming to the seven digit or eight digit dial patterns are not routed. In this example, if the quantity of dialed sequences that were dialed in a given time period having a seven digit length, and/or the quantity of dialed sequences that were dialed in a given time period having an eight digit length, were larger than a certain threshold, then the seven digit dial pattern and/or the eight digit dial pattern shown above may be defined as candidate(s) for addition to the call control set. In this instance, the definition of the seven digit dial pattern and/or of the eight digit dial pattern may include the variation of [2-9] in all of the positions in the dial pattern, due to the analysis detecting such variation in each of the positions among the respective quantity of dialed sequences; or may include the variation of [2-9] in all of the positions in the dial pattern even though such variation in each of the positions was not present in the respective quantity of dialed sequences, e.g. based on a candidacy rule which allows such broadening.

In another example, it is assumed that one or more service dial patterns in the call control set are specified in accordance with the E.164 protocol (e.g. +1[2-8][11], where the + is indicative of the international call prefix and the "1" following the "+" is the country calling code for the USA or Canada) for call routing. Therefore calls associated with dialed sequences conforming to the specified service dial pattern(s) are routed, but calls associated with dialed sequences that do not conform to the specified service dial pattern(s) are not routed. In this example, calls associated with dialed sequence(s) 311 and/or 9311 would not be routed, where 9 is dialed for outside access. If a sufficient quantity of such calls of 311 and/or 9311 are not routed in a first time period, then dial pattern 311 and/or 9311 may be added to the call control set in a first iteration, based on the analysis. If subsequently a sufficient quantity of calls associated with 411 and/or 9411 are not routed in a second time period, then dial pattern 411 and/or 9411 may be added to the call control set in a second iteration, based on the analysis. Dial pattern 411 and/or 9411 may be added in the second iteration, for example, while retaining dial pattern 311 and/or 9311. Alternatively, in accordance with a candidacy rule to expand the definition of a candidate dial pattern to encompass dial pattern(s) already in the call control set, dial pattern [3-4]11 and/or 9[3-4]11 may be added to the call control set in the second iteration, optionally replacing dial pattern 311 and/or 9311 in the call control set. Alternatively to first adding pattern 311 and/or 9311 and then 411 and/or 9411, dial pattern [3-4]11 and/or 9[3-4]11 may be more broadly defined in the first iteration from a sufficient quantity of calls associated with dialed sequences 311 and/or 9311 in the first time period. Alternatively to defining the candidate dial pattern to encompass dial patterns) already in the call control set in the second iteration, the plurality of dialed sequences that are analyzed in the second iteration may include both 311 and/or 9311 dialed sequences, and 411 and/or 9411 dialed sequences even though the dialed sequences 311 and/or 9311 previously resulted in a dial pattern 311 or 9311 being added.

Furthermore, in this example, the dial pattern +1911, 911 and/or 9911 may be in the call control set, associated with routing for the emergency call class. The candidate dial pattern(s) may be defined in this example to intentionally exclude 911 and/or 9911, due to dial pattern(s) 911 and/or 9911 being for emergency calls.

In some cases, the definition of candidate dial pattern(s) in stage 320 may be based solely on the analysis during earlier iterations of method 300, when confidence in candidacy rule(s) may be less. In later iterations of method 300, as the candidacy rule(s) are proven, the definition may be defined based also on candidacy rule(s), even though the candidate dial pattern(s) may thus be broadened/expanded, and/or narrowed.

In some cases, the analyzing of stage 310 may exclude grouping as described above, may include a different type of grouping than described above and/or may apply candidacy rule(s) in stage 310 and/or 320 that may be fewer, more and/or different than described above. For example, candidacy rule(s) in stage 320 may not necessarily include a candidacy rule for expansion to encompass dial pattern(s) already in the call control set which may then be replaced, e.g., if the quantity of dial pattern(s) in the call control set is less of a concern and therefore an unlimited number of dial pattern(s) may be included in the call control set.

In stage 330, the addition of the candidate dial pattern(s) to the call control set is promoted by generator 130 (e.g. by learner 132).

Stage 330 may include one or more suitable actions which promote the addition of the candidate dial pattern(s). Some action(s) that may be performed are illustrated as stages 332, 336 and/or 338 in FIG. 3.

Action(s) which promote addition of the candidate dial pattern(s) may include recommendation by generator 130 (e.g. by learner 132) of the candidate dial pattern(s) to administrator 106 in stage 332. If candidate dial pattern(s) encompass(es) dial pattern(s) in the call control set, the recommendation may include recommending the replacement of such dial pattern(s) in the call control set with such candidate dial pattern(s). The recommending of candidate dial pattern(s) to administrator 106 (e.g. to administrator device 108) may be performed in any suitable matter, for example, by causing the candidate dial pattern(s) to be displayed on a notification panel; by emailing the candidate dial pattern(s) to administrator 106; by texting the candidate dial pattern(s) to administrator 106, by enqueuing the candidate dial pattern(s) in a reviewable queue; by way of a web, client or mobile application; etc. Consequently, administrator device 108 may output such candidate dial pattern(s) to administrator 106, e.g. by printout, display, sound, etc.

Administrator 106 may choose (e.g. by way of input to administrator device 108) to add to the call control set at least one of the candidate dial pattern(s) which was recommended to administrator 106. If replacement of existing dial pattern(s) in the call control set by a candidate dial pattern is being recommended, administrator 106 may choose to replace the existing dial pattern(s) by the candidate dial pattern, or to add the candidate dial pattern without eliminating the existing dial pattern(s). For instance, if administrator 106 does not mind having a large quantity of dial patterns in the call control set as long as all calls with dialed sequences conforming to dial patterns for routing are routed, the candidate dial pattern may be added without eliminating the existing dial pattern(s.) Alternatively, administrator 106 may take no action and therefore not add the candidate dial pattern(s).

Additionally or alternatively, administrator 106 may approve or disapprove (e.g. by way of input to administrator device 108) addition of at least one of the recommended candidate dial pattern(s). If replacement of existing dial pattern(s) in the call control set by a candidate dial pattern is being recommended, administrator 106 may choose to approve replacement of the existing dial pattern(s) by the candidate dial pattern, approve addition of the candidate dial pattern without eliminating the existing dial pattern(s), or disapprove addition of the candidate dial pattern.

Prior to approval or addition, administrator 106 may in some instances amend at least one candidate dial pattern, e.g. by way of input to administrator device 108. Administrator 106 may use expertise that administrator 106 has gained such as in recognition of dial patterns for various call classes in order to amend a candidate dial pattern. Administrator 106 may amend a candidate dial pattern, e.g. by broadening or narrowing the variation of symbols allowed in one or more positions in the candidate dial pattern. For instance, if the candidate dial pattern is [3-4]11, and administrator 106 is aware that service calls may correspond to [2-8]11, administrator 106 may broaden the candidate dial pattern to [2-8]11, whereas if the candidate dial pattern is [1-9]11, administrator 106 may narrow the candidate dial pattern to [2-8]11 so as to exclude 911 for emergency calls. Additionally or alternatively, administrator 106 may amend a candidate dial pattern by breaking up a candidate dial pattern into two or more candidate dial patterns, or by combining two or more candidate dial patterns into one candidate dial pattern. For instance, if a candidate dial pattern is [2-9]11, administrator 106 may break up the candidate dial pattern into [2-8]11 and 911. If candidate dial patterns are [2-6]11 and [7-8]11, administrator 106 may combine the candidate dial patterns into [2-8]11.

In some cases where stage 332 is performed, administrator 106 may categorize the candidate dial pattern(s), e.g. by way of input to administrator device 108. Categorization of a dial pattern may include categorization into call class and/or categorization as a dial pattern for routing or as a dial pattern for call prevention. For instance, the call class of a candidate dial pattern that is replacing dial pattern(s) in the call control set may be categorized in the same call class and/or in the same call routing or call prevention set as the dial pattern(s) being replaced. Additionally or alternatively, administrator 106 may categorize candidate dial pattern(s) using expertise administrator 106 has gained and/or by looking up category/ies of dial pattern(s) currently being used by call control system 120 and/or category/ies of dial pattern(s) from other call control systems.

As a result of stage 332, generator 130 (e.g. learner 132) may receive approval/disapproval of addition for any of the candidate dial pattern(s) (as defined and/or as amended). Additionally or alternatively, generator 130 (e.g. learner 132) may receive feedback regarding any of the candidate dial pattern(s) such as whether or not a candidate dial pattern (as defined and/or amended) was added by administrator 106, whether the added candidate dial pattern replaced other dial pattern(s) in the call control set, the categorization of the added candidate dial pattern, etc. Administrator 106 may have inputted into administrator device 108 the approval/disapproval and/or feedback that is received by generator 130.

Stage 332 may be omitted if autonomous update of the call control set is to instead be performed for all candidate dial pattern(s).

Action(s) which promote addition to the call control set may additionally or alternatively include generator 130 (e.g. learner 132) categorizing in stage 336 the candidate dial pattern(s) into respective call class(es) and/or into routing and call prevention sets, in accordance with one or more categorization rule(s) in triggering rules 134. Stage 336 may follow receipt of approval as a result of stage 332; or stage 336 may be performed without prior approval.

For example, the categorization rule(s) may include categorizing a candidate dial pattern in the same call class (and/or in the same set of routing or call prevention) as the most similar dial pattern currently in the call control set. Continuing with describing this example, a first given candidate dial pattern may be suitable for routing/preventing a call to one or more destination devices for which no dial pattern currently in the call control set is suitable. A second given candidate dial pattern may be suitable for routing/preventing a call to one or more destination devices for which at least one other dial pattern currently in the call control set is also suitable. In this example, for the first given candidate dial pattern (e.g. 411), the most similar dial pattern currently in the call control set may be a dial pattern of the same length and optionally the same beginning or end (e.g. 311). In this example, for the second given candidate dial pattern (e.g. 9311), the most similar dial pattern currently in the call control set may be a pattern of a different length and beginning, but the same middle and end (e.g. 311). Additionally or alternatively, the dial pattern currently in the call control set (e.g. 311) that is most similar to the second given candidate dial pattern (e.g. [3-4]11) may be a dial pattern that is encompassed by the second given candidate dial pattern and optionally being replaced by the second given candidate dial pattern. However, which existing dial pattern is most similar may vary in other examples and/or the categorization rule(s) may differ in other examples.

Additionally or alternatively, categorization may not be performed autonomously in stage 336 for a candidate dial pattern suitable for routing/preventing a call to one or more destination devices for which no dial pattern currently in the call control set is suitable, and/or may not be performed autonomously in stage 336 for a candidate dial pattern suitable for routing/preventing a call to one or more destination devices for which at least one other dial pattern currently in the call control set is also suitable. For instance, autonomous categorization may be implemented during later iterations of stage 336 where there is growing confidence in the autonomous categorization and/or when there are more dial pattern(s) in the call control set to select from as the most similar dial pattern.

Stage 336 may in some instances be omitted and therefore not performed prior to performance of stage 338. For instance, stage 336 may be omitted if administrator 106 categorized the candidate dial pattern(s) and feedback regarding the categorization is received. If stage 336 is performed, stage 338 typically follows stage 336. However, in some cases, after categorization in stage 336, generator 130 (e.g. learner 132) may recommend the categorized dial pattern(s) (in an iteration of stage 332) rather than proceed to stage 338.

Action(s) which promote addition to the call control set may include generator 130, e.g. learner 132, adding in stage 338 the candidate dial pattern(s) defined in stage 320, or any of the candidate dial pattern(s) that were approved as a result of stage 332 (optionally as amended by administrator 106) to the call control set. Stage 338 may follow stage 336, or may follow receipt of approval as a result of stage 332.

Optionally, generator 130 (e.g. learner 332) informs administrator 106 of any candidate dial pattern(s) added in stage 338 without prior approval of administrator 106. Informing to administrator 106 (e.g. to administrator device 108) may be performed in any suitable matter and consequently, administrator device 108 may output such candidate dial pattern(s) to administrator 106 as described above with reference to stage 332. Notification of administrator 106 regarding the candidate dial pattern(s) that are being promoted for addition may therefore include the recommending in stage 332 and/or the informing of candidate dial pattern(s) that were added without prior approval.

Stages 336 and 338 may be omitted if only manual addition of candidate dial pattern(s) to the call control set is performed.

In some examples, manual addition of candidate dial pattern(s) to the call control set (e.g. addition by administrator 106), or semiautonomous addition to the call control set (e.g. addition after approval of administrator 106) may be implemented during the first iterations of method 300 when administrator 106 is less confident in the definition of the candidate dial pattern(s). Autonomous addition to the call control set (e.g. without prior approval) may be implemented during later iterations of method 300 when the confidence of administrator 106 in the definition of candidate dial pattern(s) increases. Additionally or alternatively, autonomous addition to the call control set of a given candidate dial pattern may be performed if there is no administrator, and/or if addition of the given candidate dial pattern is not expected to have a negative impact, such as a negative impact on user experience (e.g. for user 102) and/or on cost. For instance, addition of a candidate dial pattern that is categorized as a local call or a toll free dial pattern may not be expected to have a negative impact on cost. Addition of a candidate dial pattern categorized as an emergency dial pattern may have a negative impact on user experience if certain dialed sequences associated with non-emergency calls conform to such a candidate dial pattern. Therefore in some cases a candidate dial pattern categorized as an emergency dial pattern may be recommended to administrator 106, even if candidate dial pattern(s) categorized as other call class dial pattern(s) are autonomously added.

In optional stage 350, generator 130 performs at least one consequent action, consequent to the promotion of stage 330. Any suitable consequent action(s) may be performed. Some examples of consequent action(s) that may be performed are illustrated as stages 352, 354, 356, and/or 358 in FIG. 3.

Consequent action(s) may include generator 130 in stage 352 updating data (e.g. learner 132 updating data stored in datastore 136). The update may be based at least partly on feedback from administrator 106, function(s) performed by generator 130, and/or function(s) performed by call control system 120. For instance, learner 132 may update datastore 136 regarding the candidate dial pattern(s), including indications of which candidate dial pattern(s) were added (as defined or as amended) to the call control set and/or which candidate dial pattern(s) were not added (e.g. because administrator 106 did not add or approve adding the candidate dial pattern(s)). Such an update optionally records characteristics of the candidate dial pattern(s), such as call class for a given dial pattern, whether the given dial pattern is for routing or call prevention, etc. Additionally or alternatively for instance, learner 132 may update datastore 136 to indicate which dialed sequences of the plurality of dialed sequences that were analyzed conform to any of the candidate dial pattern(s), and/or which conform to any of the candidate dial pattern(s) that were added (as defined or as amended) to the call control set. In such instances, in subsequent iterations of method 300, the determination of other candidate dial pattern(s) may take into account the current candidate dial pattern(s) (that were defined or that were added) and/or the dialed sequences conforming to the current candidate dial pattern(s). For example, such dialed sequences may not be analyzed in subsequent iterations; such other candidate dial patterns may be precluded from being identical to the current candidate dial patterns; etc.

Additionally or alternatively, consequent action(s) may include generator 130 (e.g. learner 132) in stage 354 updating triggering rules 134 in any appropriate manner. The update may be at least partly based on analysis of at least part of the candidate dial pattern(s). For instance, if too few or no candidate dial pattern(s) are defined and too few dialed sequences are analyzed, validation rule(s) may be updated so that in a future iteration, fewer dial sequences are invalidated, and more dial sequences associated with unrouted calls are analyzed. In another instance, if too many candidate dial pattern(s) are not approved/not added by administrator 106 and too many dialed sequences are analyzed, validation rule(s) may be updated so that in a future iteration more dial sequences are invalidated and fewer dial sequences associated with unrouted calls are analyzed. In another instance, if too few or no candidate dial pattern(s) are defined even though a sufficient quantity of candidate dial patterns are analyzed, candidacy rule(s) may be updated so that more candidate dial pattern(s) may be defined from the same quantity of analyzed dialed sequences in a future iteration. In another instance, if too many candidate dial pattern(s) are not approved/not added by administrator 106 even though the quantity of dialed sequences that is analyzed is not too large, candidacy rule(s) may be updated so that fewer candidate dial pattern(s) may be defined from the same quantity of analyzed dialed sequences in a future iteration. For example, updating candidacy rule(s) may include changing the threshold value(s), changing grouping(s), etc. When analyzing the at least part of the candidate dial pattern(s), what is considered too few, too many, sufficient or not too large may have been previously set by generator 130, for instance, based at least partly on previous iterations of method 300. Continuing with describing such an instance, previous iterations may have determined that a ratio of one candidate dial pattern per twenty dialed sequences in the plurality that is analyzed to a ratio of one dial pattern per five dialed sequences in the plurality that is analyzed (or any other two suitable ratios) is the target range, and that at least 80% (or any other suitable percentage) of the candidate dial patterns should be approved/added.

Additionally or alternatively, consequent action(s) may include generator 130 (e.g. learner 132) in stage 356 analyzing at least part of the candidate dial pattern(s) (e.g. all defined candidate dial pattern(s) or the candidate dial pattern(s) that are added to the call control set) in order to proactively define additional dial pattern(s) to promote for addition to the call control set. Such additional dial pattern(s) may be defined without further analysis of dialed sequences, e.g. by employing heuristics. Generator 130 may determine, for example, from analysis of the at least part of the candidate dial pattern(s) that one or more of such candidate dial pattern(s) includes a "9" as the first symbol, and the symbols in the remaining positions of the candidate dial pattern(s) resemble certain dial pattern(s) in the call control set. Generator 130 may then promote addition to the call control set of additional dial pattern(s) which include a "9" as the first symbol and are otherwise the same as further dial pattern(s) in the call control set. Stage 356 if performed, may include one or more similar stage(s) to any of stage(s) 332 to 338, but with respect to the additional dial pattern(s).

Additionally or alternatively, consequent action(s) may include generator 130 in stage 358 determining least cost routing. For example, data miner 138 may use LCR metadata 140, such as price schedule(s) obtained from a least cost router (e.g. device or software), in order to determine least cost routing. Least cost routing may be determined, for instance, if call control system 120 is associated with a communications service provider. In such an instance, the price schedule(s) may include price(s) negotiated between a communications service provider associated with call control system 120 and suppliers.

Data miner 138 may, for example, select dialed sequences in datastore 136 which conform to candidate dial pattern(s) for call routing that were added to the call control set, and use LCR metadata 140 to determine the least cost routing to be used for calls associated with such dialed sequences. Additionally or alternatively, data miner 138 may, for example, generate dialable sequences that conform to the added candidate dial pattern(s) for call routing (regardless of whether or not such sequences are in datastore 136) and use LCR metadata 140 to determine the least cost routing to be used for calls associated with such dialable sequences. In some embodiments, e.g. where it is likely that a given sequence represents an actual physical area corresponding to the country code and area code/national code of the given sequence, least cost routing may be determined for calls associated with a group of sequences with shared characteristics (e.g. shared country code and area code/national code), rather than individually for calls associated with individual sequences in the group.

Administrator 106 (e.g. by way of administrator device 108) is optionally notified of the least cost routing in any suitable manner and consequently, administrator device 108 may output such least cost routing to administrator 106, as described above with reference to stage 332. For example, the least cost routing may be recommended by generator 130 (e.g. by data miner 138) to administrator 106, and then implemented by administrator 106 in call control system 120. Alternatively, the least cost routing may be recommended to administrator 106, and upon approval, generator 130 (e.g. data miner 138) may implement the least cost routing in call control system 120. Alternatively, generator 130 (e.g. data miner 138) may implement the least cost routing in call control system 120 without first receiving approval from administrator 106, optionally informing administrator 106 of the least cost routing.

In some embodiments, stage 350 may instead be omitted, or one or more of stages 352, 354, 356 and/or 358 may be omitted.

Method 300 then ends. Method 300 may be repeated when appropriate. For instance, method 300 may be repeated each time another dialed sequence is received by generator 130 (e.g. by learner 132), each time another dialed sequence is validated by generator 130 (e.g. by learner 132), each time another dialed sequence that does not conform to any dial pattern used for call control by call control system 120 is received by generator 130 and/or validated by generator 130, etc. Additionally or alternatively, method 300 may be repeated periodically. Additionally or alternatively, method 300 may be repeated due to an event, such as the receipt or validation of a certain quantity of dialed sequences, upon request of administrator 106, etc.

In some embodiments of method 300, method 300 may include fewer, more and/or different stages than shown in FIG. 3. For example any of stage(s) 332, 334, 336, 338 and/or 350 may be omitted in some embodiments. Additionally or alternatively in some embodiments, stage(s) may be performed in a different order than shown in FIG. 3, stages shown in FIG. 3 as being performed in parallel may be performed consecutively, and/or stages shown in FIG. 3 as being performed consecutively may be performed in parallel.

FIG. 4 is a flowchart of a method 400, in accordance with some embodiments of the presently disclosed subject matter.

In stage 410, generator 130 (e.g. learner 132) analyzes a plurality of dialed sequences associated with routed calls and/or associated with prevented calls. The analysis includes comparing the plurality of dialed sequences to a call control set in accordance with one or more deletion rules included in triggering rules 134. In some cases, a comparison may not be performed unless there is at least one dial pattern in the call control set.

It is assumed that the call control set may include a call routing set and/or may include a call prevention set. The dialed sequence(s) in the plurality that are associated with routed call(s), if any, may be compared, for instance, to dial pattern(s) in the call routing set, if any, and/or the dialed sequence(s) in the plurality that are associated with prevented call(s), if any, may be compared, for instance, to dial pattern(s) in the call prevention set, if any. Alternatively, for instance, all of the dialed sequence(s) in the plurality may be compared to the dial pattern(s) in the call control set, if any. The plurality of dialed sequences may have been inputted via dialing device 110 and/or via any other device(s) that initiated calls routed and/or prevented by call control system 120.

The plurality of dialed sequences may include, for example, dialed sequences associated with a given time period. In such an example, time indications (e.g. indicative of the time of dialing, indicative of the time of the decision to route or to prevent, indicative of the time of storage in datastore 136, etc.) are optionally stored in association with the dialed sequences in datastore 136, and may be used to determine which dialed sequence(s) are associated with the given time period. The given time period may be the time period since the last iteration of method 410; may be the time period from the beginning of implementation of generator 130 for call control system 120; etc.

The deletion rule(s) may include any suitable deletion rule(s). For example, the deletion rule(s) may include a rule that a dial pattern is considered unused if none of the plurality of dialed sequences conform to the dial pattern.

In stage 420, based at least partly on the comparing, one or more unused dial patterns in the call control set are determined by generator 130 (e.g. by leaner 132).

In stage 430, the deletion of the unused dial pattern(s) from the call control set is promoted by generator 130 (e.g. by learner 132).

Stage 430 may include one or more suitable actions which promote the deletion of the unused dial pattern(s). Some action(s) that may be performed are illustrated as stages 432 and/or 436 in FIG. 4.

Action(s) which promote deletion of unused dial pattern(s) may include recommendation by generator 130 (e.g. by learner 132) of the unused dial pattern(s) to administrator 106 in stage 432. The recommending may be performed in any suitable matter to administrator 106 (e.g. to administrator device 108) and consequently administrator device 108 may output such unused dial pattern(s) to administrator 106, as described above with reference to stage 332 of FIG. 3.

Administrator may then choose (e.g. by way of input to administrator device 108) to remove from the call control set at least one of the unused dial pattern(s) that was recommended to administrator 106. Alternatively, administrator 106 may take no action and therefore not delete the unused dial pattern(s).

Additionally or alternatively, administrator 106 may approve or disapprove deletion of at least one recommended unused dial pattern, (e.g. by way of input to administrator device 108).

As a result of stage 432, generator 130, e.g. learner 132 may receive approval/disapproval of deletion for any of the unused dial pattern(s). Additionally or alternatively, generator 130 may receive feedback regarding any of the unused dial pattern(s) such as whether or not any of the unused dial pattern(s) were deleted by administrator 106. Administrator 106 may have inputted into administrator device 108 the approval/disapproval and/or feedback that is received by generator 130.

Stage 432 may be omitted, if autonomous update of the call control set is to be performed instead for all unused dial pattern(s).

Action(s) which promote deletion of unused dial pattern(s) may include stage 436. Stage 436 may follow receipt of approval as a result of stage 432, or may be performed without prior approval. In stage 436, generator 130 (e.g. learner 132) deletes the unused dial pattern(s) determined in stage 420, or any of the unused dial pattern(s) that were approved for deletion by administrator 106, from the call control set.

Optionally, generator 130 (e.g. learner 132) informs administrator 106 of any of the unused dial pattern(s) that were deleted in stage 336 without prior approval of administrator 106. Informing may be performed in any suitable matter to administrator 106 (e.g. to administrator device 108) and consequently administrator device 108 may output such unused dial pattern(s) to administrator 106, as described above with reference to stage 332 of FIG. 3. Notification of administrator 106 of unused dial pattern(s) that are being promoted for deletion may therefore include the recommending in stage 432 and/or the informing of unused dial pattern(s) that were deleted without pre-approval.

Stage 436 may be omitted if only manual deletion of unused dial pattern(s) from the call control set is performed.

In some examples, manual deletion of unused dial pattern(s) from the set (e.g. deletion by administrator 106), or semiautonomous deletion (e.g. deletion after approval of administrator 106) may be implemented during earlier iterations of method 400 when administrator 106 is less confident in the determination of the unused dial pattern(s). Autonomous deletion (e.g. without prior approval) may be implemented during later iterations of method 400 when the confidence of administrator 106 in the determination of unused dial pattern(s) increases. Additionally or alternatively, autonomous deletion may be performed if there is no administrator. Additionally or alternatively, autonomous deletion may not be performed if the impact of an incorrect deletion could be negative. For instance, a communications service provider associated with call control system 120 may not want any unused dial patterns in a call routing set to be deleted, in case such a deletion would result in future unrouted call(s) and consequently a negative user experience (e.g. for user 102). Additionally or alternatively, an entity associated with call control system 120 may not want any unused dial patterns in a call prevention set to be deleted, in case such a deletion may result, for instance, in increased costs due to future call(s) not being prevented.

In optional stage 450, generator 130 performs at least one consequent action, consequent to the promotion of stage 430. Any suitable consequent action(s) may be performed. Some examples of action(s) that may be performed are illustrated as stages 452, 454, and/or 456 in FIG. 4.

Consequent action(s) may include generator 130 in stage 452 updating data (e.g. learner 132 may update data stored in datastore 136). The update may be based at least partly on feedback from administrator 106, function(s) performed by generator 130, and/or function(s) performed by call control system 120. For instance, learner 132 may update datastore 136 regarding the unused dial pattern(s), including indications of which unused dial pattern(s) were deleted and/or which unused dial pattern(s) were not deleted (e.g. because administrator 106 did not delete or approve deleting the unused dial pattern(s)). In such an instance, in subsequent iterations of method 400, the comparing stage 410 may preclude comparing such unused dial patterns to dialed sequences.

Additionally or alternatively, consequent action(s) may include generator 130 (e.g. learner 132) in stage 454 updating triggering rules 134 in any appropriate manner. The update may be at least partly based on analysis of at least part of the unused dial pattern(s). For instance, if too many unused dial pattern(s) are determined, the deletion rule(s) may be updated so that in a future iteration, the time period associated with the analyzed dialed sequences may be longer, and fewer unused dial pattern(s) may be determined. In another instance, if too many unused dial pattern(s) are not approved/not deleted by administrator 106, the deletion rule(s) may be updated so that in a future iteration, the time period associated with the analyzed sequences may be longer, and fewer unused dial pattern(s) may be determined. When analyzing the at least part of the unused dial pattern(s), what is considered too many may have been previously set by generator 130 (e.g. leaner 132), for instance, based at least partly on previous iterations of method 400. Continuing with describing this instance, previous iterations may have determined that not more than one unused dial pattern (or any other suitable quantity) should be determined per iteration of method 400, and that at least 90% (or any other suitable percentage) of the unused dial pattern(s) should be approved/deleted.

Additionally or alternatively, consequent action(s) may include generator 130 (e.g. learner 132) in stage 456 analyzing at least part of the unused dial pattern(s) (e.g. all determined unused dial pattern(s) or the unused dial pattern(s) that are deleted from the call control set) in order to proactively determine additional dial pattern(s) to promote for deletion from the call control set. Such additional dial pattern(s) may be determined without further analysis of dialed sequences, e.g. by employing heuristics. Learner 132 may determine, for example, from analysis of the at least part of the unused dial pattern(s) that one or more of such unused dial pattern(s) includes a "9" as the first symbol. Learner 132 may then promote deletion of additional dial pattern(s) from the call control set which include a "9" as the first symbol and which are therefore presumed to be unused. Stage 456, if performed may include one or more similar stage(s) to any of stage(s) 432 to 438, but with respect to the additional dial pattern(s).

In some embodiments, stage 450 may instead be omitted, or one or more of stages 452, 454 and/or 456 may be omitted.

Method 400 then ends. Method 400 may be repeated when appropriate. For instance, method 400 may be repeated periodically. Additionally or alternatively, method 400 may be repeated due to an event, such as upon request of administrator 106, etc.

In some embodiments of method 400, method 400 may include fewer, more and/or different stages than shown in FIG. 4. For example any of stage(s) 432, 436 and/or 450 may be omitted in some embodiments. Additionally or alternatively in some embodiments, stage(s) may be performed in a different order than shown in FIG. 4, stages shown in FIG. 4 as being performed in parallel may be performed consecutively, and/or stages shown in FIG. 4 as being performed consecutively may be performed in parallel.

Method 400 may not necessarily be performed in all implementations of generator 130. For example, if the quantity of dial pattern(s) allowable in a call control set for call control system 120 is unlimited, deletion of dial pattern(s) from the call control set may not necessarily be implemented.

In some embodiments, methods 300 and 400 may be combined, for instance by combining one or more stages of each of methods 300 and 400. For instance, stages 330 and 430 may be combined and generator 130 (e.g. learner 132) may promote concurrently both addition of candidate dial pattern(s), if any, and deletion of unused dial pattern(s), if any, (e.g. by adding and/or deleting dial pattern(s); by recommending to administrator 106 any candidate dial pattern(s) and any unused dial pattern(s); etc.). In another instance, any of stages 352, 354, 356, 452, 454, and/or 456 may additionally or alternatively be combined, and generator 130 may perform at least one consequent action, consequent to the promotion of addition of any candidate dial pattern(s) and/or deletion of any unused dial pattern(s), such as updating datastore 132 and/or triggering rules 134, promoting additional dial patterns, etc.

In addition to methods 300 and/or 400, some embodiments of the subject matter allow for administrator 106 to manually update a call control set independently of any dial pattern(s) promoted by generator 130. For example, administrator 106 may proactively and/or reactively update the call control set due to anticipated change(s) in dialing habits and/or user comments, and by way of input to administrator device 108.

Figure 5:
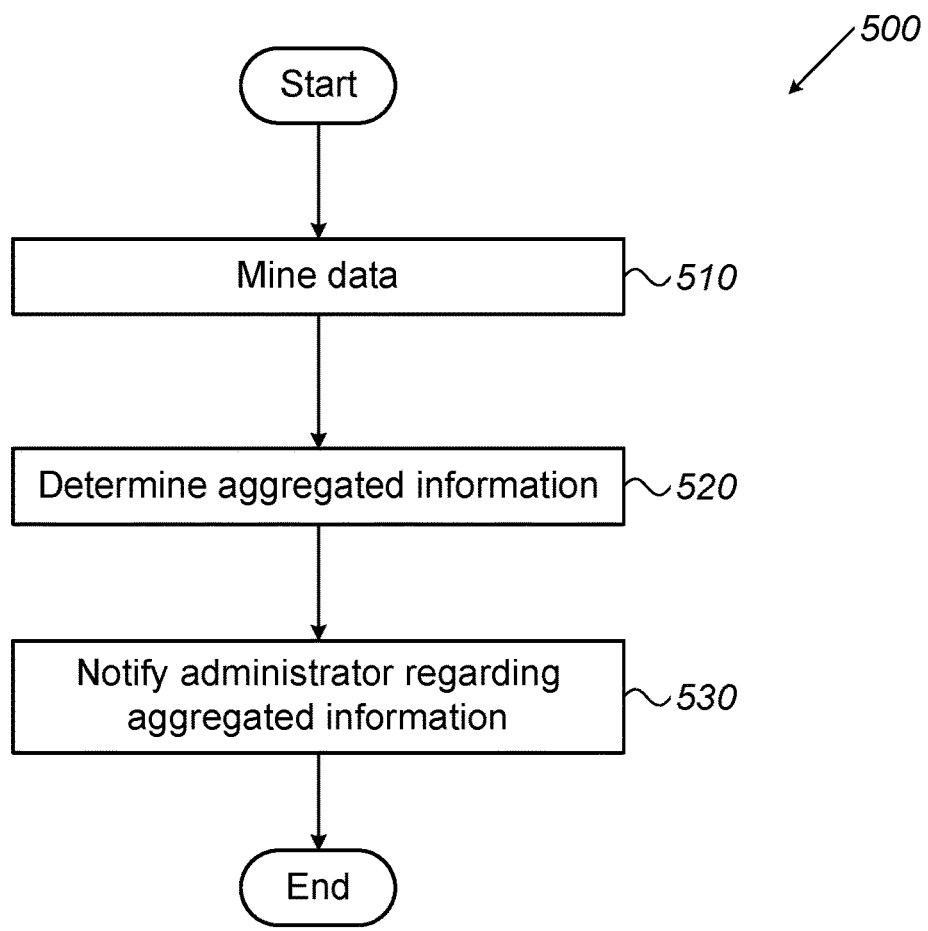
FIG. 5 is still yet another flowchart of a method, in accordance with some embodiments of the presently disclosed subject matter.

FIG. 5 is a flowchart of a method 500, in accordance with some embodiments of the presently disclosed subject matter.

In stage 510, generator 130 mines data (e.g. data miner 138 mines the data in datastore 136).

In stage 520, generator 130 (e.g. data miner 138) determines aggregated information regarding call control system 120, based at least partly on the data mining of stage 510 (e.g. based at least partly on examination of the mined data).

The aggregated information that may be determined may include any suitable aggregated information. For example, the aggregated information may include information regarding the dialed sequences handled by call control system 120, such as the quantity of unrouted calls (e.g. equivalent to the quantity of dialed sequences associated with unrouted calls), the quantity of routed calls (e.g. equivalent to the quantity of dialed sequences associated with routed calls), the quantity of unrouted calls due to call prevention (e.g. equivalent to the quantity of dialed sequences conforming to call prevention dial patterns), the quantity of unrouted calls due to dialed sequences not conforming to any dial patterns for call control, the quantity of routed calls broken down by call class, the quantity of non-validated dialed sequences, etc. Additionally or alternatively, the aggregated information may include information regarding the dial plan of call control system 120, such as the quantity of candidate dial patterns, the quantity of candidate dial patterns that were added to the call control set, the quantity of added candidate dial patterns broken down by call class, the quantity of added candidate dial patterns broken down by call routing versus call prevention, the quantity of unused dial patterns, the quantity of unused dial patterns that were deleted from the call control set, the quantity of deleted unused dial patterns broken down by call class, the quantity of deleted unused dial patterns broken down by call routing versus call prevention, etc.

Additionally or alternatively, the aggregated information may include the least cost routing that was determined in stage 358 of method 300 (FIG. 3) for various sequences using LCR metadata.

Optionally, the aggregated information additionally or alternatively includes information regarding the quantity of calls that call control system 120 let through and/or the quantity of calls that call control system 120 blocked, provided generator 130 receives indications from call control system 120 when calls are let through or blocked.

In stage 530, generator 130 (e.g. data miner 138) may notify administrator 106 regarding the aggregated information in any appropriate manner. For instance, data miner 138 may generate a report and provide the report to administrator device 108. The report may be provided in any suitable matter to administrator 106 (e.g. to administrator device 108) as described above with reference to stage 332.

Method 500 then ends. Method 500 may be repeated when appropriate. For instance, method 500 may be repeated periodically. Additionally or alternatively, method 500 may be repeated due to an event, such as upon request of administrator 106, due to performance of any of methods 200, 300 and/or 400 (or due to performance of multiple iterations of any of methods 200, 300 and/or 400), etc.

It will be appreciated that the subject matter contemplates, for example, a computer program product comprising a computer readable medium having computer readable program code embodied therein for executing one or more methods disclosed herein; for executing one or more parts of method(s) disclosed herein; and/or for implementing functionality of any of the modules described herein for the system. Further contemplated, for example, is computer readable program code for executing method(s) disclosed herein; for executing part(s) of method(s) disclosed herein; and/or for implementing functionality of any of the modules described herein for the system. Further contemplated, for example, is a computer readable medium having computer readable progam code embodied therein for executing method(s) disclosed herein; for executing part(s) of method(s) disclosed herein; and/or for implementing functionality of any of the modules described herein for the system.

In the above description of example embodiments, numerous specific details are set forth in order to provide a thorough understanding of the subject matter. However, it will be appreciated by those skilled in the art that some examples of the subject matter may be practiced without these specific details. In other instances, well-brown features have not been described in detail so as not to obscure the subject matter.

It will also be appreciated that various features of the subject matter which are, for clarity, described in the contexts of separate embodiments may also be provided in combination in a single embodiment. Conversely, various features of the subject matter which are, for brevity, described in the context of a single embodiment may also be provided separately or in any suitable subcombination.

It will further be appreciated by persons skilled in the art that the presently disclosed subject matter is not limited by what has been particularly shown and described hereinabove. Rather the scope of the subject matter is defined by the appended claims and equivalents thereof:

What is claimed is:

1. A method comprising:
    analyzing, using a generator that includes at least one processor, a plurality of dialed sequences that are associated with unrouted calls made by one or more call dialing devices or processes in accordance with one or more candidacy rules;
    based at least partly on said analyzing, defining, using the generator, one or more candidate dial patterns for addition to a set that includes zero or more dial patterns in use for call control; and
    performing, using the generator, at least one action which promotes addition of the one or more candidate dial patterns to the set, wherein said performing at least one action includes: recommending at least one of the one or more candidate dial patterns, and upon receiving approval to add to the set at least one approved dial pattern from the at least one candidate dial pattern which was recommended, adding the at least one approved candidate dial pattern to the set.

2. The method of claim 1, wherein one or more of the at least one approved candidate dial pattern was amended prior to being approved.

3. The method of claim 1, wherein said performing at least one action includes: categorizing each of at least one of the candidate dial patterns into a respective call class.

4. The method of claim 1, wherein said performing at least one action includes: adding at least one of the one or more candidate dial patterns to the set.

5. The method of claim 1, wherein the one or more candidate dial patterns includes at least one dial pattern for call routing.

6. The method of claim 5, wherein the at least one dial pattern for call routing is added to the set, the method further comprising: using least cost routing metadata to determine routing for at least one sequence conforming to any of the at least one dial pattern for call routing.

7. The method of claim 1, wherein the one or more candidate dial patterns include at least one dial pattern for call prevention.

8. The method of claim 1, further comprising: validating the plurality of dialed sequences in accordance with one or more validation rules, and storing at least part of the plurality of dialed sequences prior to said analyzing.

9. The method of claim 1, wherein said analyzing includes: comparing to a threshold, a quantity of dialed sequences that are similar in accordance with at least one criterion, from the plurality of dialed sequences, and wherein said defining includes: provided said quantity is at least equal to or larger than the threshold, defining a first candidate dial pattern to which at least said similar dialed sequences conform, said first candidate dial pattern included in said one or more candidate dial patterns.

10. The method of claim 1, further comprising:
    analyzing at least part of said one or more candidate dial patterns; and
    based at least partly on said analyzing of said at least part, performing at least one of: defining at least one other dial pattern to promote for addition to the set, or updating at least one of one or more triggering rules, the one or more triggering rules including the one or more candidacy rules.

11. The method of claim 1, further comprising: receiving a dialed sequence that is associated with an unrouted call, wherein said plurality of dialed sequences includes the dialed sequence, and wherein said one or more candidate dial patterns includes at least one dial pattern to which said dialed sequence conforms.

12. The method of claim 1, further comprising:
comparing to one or more dial patterns in the set, in accordance with one or more deletion rules, a plurality of dialed sequences that are associated with at least one of: routed calls or prevented calls;
based at least partly on said comparing, determining one or more unused dial patterns in the set; and
promoting deletion of the one or more unused dial patterns from the set.

13. The method of claim 12, further comprising: generating a report that includes a quantity of the routed calls, broken down by call class.

14. A system comprising:
a generator having one or more computer processors;
one or more call dialing devices or processes;
one or more computer readable storage media;
program instructions stored on the one or more computer readable storage media for execution by at least one of the one or more computer processors, the program instructions comprising instructions to:
analyze, using the generator, a plurality of dialed sequences that are associated with unrouted calls made by the one or more call dialing devices or processes in accordance with one or more candidacy rules;
based at least partly on said analyzing, define, using the generator, one or more candidate dial patterns for addition to a set that includes zero or more dial patterns in use for call control; and
perform, using the generator, at least one action which promotes addition of the one or more candidate dial patterns to the set, wherein performing the at least one action includes: recommending at least one of the one or more candidate dial patterns, and upon receiving approval to add to the set at least one approved dial pattern from the at least one candidate dial pattern which was recommended, adding the at least one approved candidate dial pattern to the set.

15. The system of claim 14, wherein one or more of the at least one approved candidate dial pattern was amended prior to being approved.

16. The system of claim 14, wherein performing the at least one action includes: adding at least one of the one or more candidate dial patterns to the set.

17. The system of claim 14, wherein the generator is configured to: validate the plurality of dialed sequences in accordance with one or more validation rules, and store at least part of the plurality of dialed sequences prior to said analyzing.

18. A computer program product comprising a non-transitory computer readable medium having computer readable program code embodied therein, the computer program product comprising:
computer readable code for causing one or more processors to analyze, using a generator, a plurality of dialed sequences that are associated with unrouted calls made by one or more call dialing devices or processes in accordance with one or more candidacy rules;
computer readable code for causing the one or more processors to define, using the generator, one or more candidate dial patterns for addition to a set that includes zero or more dial patterns in use for call control, based at least partly on said analyzing; and
computer readable code for causing the one or more processors to perform, using the generator, at least one action which promotes addition of the one or more candidate dial patterns to the set, wherein performing the at least one action includes: recommending at least one of the one or more candidate dial patterns, and upon receiving approval to add to the set at least one approved dial pattern from the at least one candidate dial pattern which was recommended, adding the at least one approved candidate dial pattern to the set.

19. The computer program product of claim 18, wherein the instructions cause the generator to perform the at least one action by adding at least one of the one or more candidate dial patterns to the set.

20. The computer program product of claim 18, wherein the instructions cause the generator to:
validate the plurality of dialed sequences in accordance with one or more validation rules; and
store at least part of the plurality of dialed sequences prior to said analyzing.

* * * * *